US005891932A

United States Patent [19]
Benz et al.

[11] Patent Number: 5,891,932
[45] Date of Patent: Apr. 6, 1999

[54] TERPOLYMER FOR CONTACT LENS

[75] Inventors: Patrick H. Benz; Jose A. Ors, both of Sarasota, Fla.

[73] Assignee: Benz Research and Development Corporation, Sarasota, Fla.

[21] Appl. No.: 976,497

[22] Filed: Nov. 24, 1997

[51] Int. Cl.$^6$ ............................... G02C 7/04; C08L 29/02
[52] U.S. Cl. .................... 523/106; 351/160 H; 524/558; 526/320; 264/2.6
[58] Field of Search ........................ 523/106; 351/160 H; 526/310; 264/2.6; 524/558

[56] References Cited

U.S. PATENT DOCUMENTS

| | | | |
|---|---|---|---|
| 3,947,401 | 3/1976 | Stamberger | 351/160 |
| 3,985,697 | 10/1976 | Urbach | 351/160 |
| 4,038,264 | 7/1977 | Rostoker et al. | 351/160 |
| 4,056,496 | 11/1977 | Mancini et al. | 128/130 |
| 5,532,289 | 7/1996 | Benz et al. | 523/106 |

FOREIGN PATENT DOCUMENTS 6-88949  3/1994  Japan .

OTHER PUBLICATIONS

Andrasko, Hydration Levels and Oxygen Transmissivities of Ophthalmic Polymer In Situ, These Ohio State University, 1980.

McCarey et al., pH, Osmolarity and Temperature Effects on the Water content of Hydrogel Contact Lenses, Contact and Intraocular Lens Medical Journal 8, 158–167, 1982.

Businger et al., Die Beeinflussung der Dehydration von hydrophilen Kontaktlinsen durch verschiedene Linsenparameter, Deutsche Optiker Zeitunhg 40, 99–102 (1985).

Helton et al., Hydrogel Contact Lens Dehydration on Rates Determined by Thermogravimetric Analysis CLAO 17, 59–61 (1991).

Andrasko et al., The Effect of Humidity on the Dehydration of Soft Contact Lenses on the Eye, Int. Cl. Clinic 7, 30 (1982).

Eng et al., The Wearing of Hydrogpholic Contact Lenses Aboard a Commercial Jet Aircraft: 1 Humidity Effects on Fit Aviat. Space Environ. Mad. 53,235 (1982).

Percosolido, et al., Nuclear Magnetic Resonance Study of Dehydration in Giyceryl–methyl methacrlate Contact Lens, Contactologia 15D, 64 (1993).

Businger, GMA/HEMA: First Report on a Clinical Trial, Contact Lens Spectrum (Aug. 1995).

Benz and Ors, New Materials Demand More Accurate Measurements of Performance Contact Lens Spectrum (Jul. 1997).

Benz RX Contact Lens Materials; Manufacturing and Technical Manual—Sep. 1992.

Benz RX Contact Lens Materials; Manufacturing and Technical Manual—Apr. 1993.

Benz RX Contact Lens Materials; Manufacturing and Technical Manual—Apr. 1994.

Benz Reasearch and Development Manufacturing and Technical Manual—Apr. 1992.

GMA/HEMA; Report on a Clinical Study, Contact Lens Spectrum—Aug. 1992, by Urs Businger, O.D., F.A.A.O. from the University of Houston College of Optometry.

*Primary Examiner*—Andrew E. C. Merriam
*Attorney, Agent, or Firm*—Foley & Lardner

[57] ABSTRACT

An ionic contact lens made from a terpolymer of 2,3-dihydroxypropyl methacrylate, 2-hydroxyethyl methacrylate, and methacrylic acid. The contact lens has excellent properties including good strength and excellent water retention properties and excellent dimensional stability.

22 Claims, 3 Drawing Sheets

FIGURE 3. Relative Water Balance for GMA Ionic Terpolymers

TERPOLYMER FOR CONTACT LENS

BACKGROUND OF THE INVENTION

1. Field of the Invention

The present invention relates to a contact lens having improved properties. More particularly, the invention relates to an ionic contact lens having improved dimensional stability and water retention. The contact lens is made of an ionic polymer. The invention also relates to an ionic polymer useful in contact lenses, and also to methods of making and using the polymer and contact lens.

2. Description of Related Art

As described in U.S. Pat. No. 5,532,289 and U.S. Ser. No. 08/674,275 filed Jul. 1, 1996, both incorporated herein by reference in their entirety, the ability of a hydrogel lens to maintain its water saturated state is important for maximum lens stability. Hydrogel lenses dehydrate because water evaporates continuously from their surface. Dehydration of a contact lens results in a change in the dimensions of the lens, hence dehydration has a direct effect upon dimensional stability. Conventional contact lenses undergo a significant degree of dehydration during use and, accordingly, have a significant degree of dimensional instability, particularly at higher water contents.

Further, rehydration is important to the dimensional stability of a contact lens. If a lens material absorbs water rapidly, then the lens will more closely return to a water-saturated state during each blink, when the lens is bathed in tear fluid. Therefore, as a lens begins to dehydrate, a characteristic of rapid rehydration is extremely advantageous for maintaining saturation and maximum stability of the lens.

Unfortunately, conventional ionic contact lens development either has ignored the effect of rehydration rate upon lenses or has constructed lenses of materials with a less than optimal rate of rehydration. As such, there remains a need for an ionic contact lens possessing superior dimensional stability and having a low rate of dehydration and a high rate of rehydration.

Ionic hydrophilic lenses introduced in recent years have been based on either existing materials employing new production technology or slight modifications of known compositions. This lack of progress in the ionic soft lens field has resulted in a large variety of lens designs, but a narrow choice of lens materials and a narrow range of lens stabilities as measured by water balance ratio.

Limited choice in lens material is problematic when attempting to fit contact lenses on patients subject to a wide variety of physiological and environmental conditions. For example, an array of factors affect contact lens comfort and stability, such as, tear quantity, ambient humidity, prolonged open eye periods, and airflow around the eye. Especially difficult cases are posed by patients with dry eyes.

The dehydration of hydrophilic lenses is a major problem, affecting lens movement, lens power, oxygen permeability, and comfort. Various factors including patient physiology, environment, lens design, and lens material significantly influence the rate of dehydration, as described in Andrasko, *Hydration Levels and Oxygen Transmissivities of Ophthalmic Polymer* In Situ, Theses, Ohio State University, 1980, and McCarey et al. pH, Osmolarity and Temperature Effects on the Water Content of Hydrogel Contact Lenses, *Contact and Intraocular Lens Medical Journal* 8, 158–167, 1982. Thicker lenses also appear to dehydrate less than thinner lenses, as described in Businger et al., Die Beeinflussung der Dehydration von hydrophilen Kontaktlinsen durch verschiedene Linsenparameter, *Deutsche Optiker Zeitung* 40, 99–102 (1985).

While a variety of hydrophilic lens materials are available, they differ only slightly in their rates of dehydration, as described in Helton et al., Hydrogel Contact Lens Dehydration on Rates Determined by Thermogravimetric Analysis *CLAO* 17, 59–61 (1991). These factors are particularly pronounced during the cold season or in dry environments, see Andrasko et al., The Effect of Humidity on the Dehydration of Soft Contact Lenses on the Eye, *Int. Cl. Clinic* 7, 30 (1982) and Eng et al., The Wearing of Hydrophilic Contact Lenses Aboard a Commercial Jet Aircraft: 1 Humidity Effects on Fit, Aviat. Space Environ. Med. 53,235 (1982).

Non-ionic materials containing glyceryl methacrylate have been reported to have improved internal water retention over poly-HEMA, see Pescosolido, et al., Nuclear Magnetic Resonance Study of Dehydration in Glyceryl-methyl-methacrylate Contact Lens, Contactologia 15D, 64 (1993), see Businger, GMA/HEMA: First Report on a Clinical Trial, *Contact Lens Spectrum* (August 1995), see Benz and Ors, New Materials Demand More Accurate Measurements of Performance *Contact Lens Spectrum* (July 1997).

The ability of a hydrogel lens to maintain its saturated state is important for lens stability. All hydrogel lenses dehydrate. Water evaporates from the surface of a hydrogel lens continuously. The amount of water loss that a lens will experience depends upon the dehydration/rehydration behavior of the particular lens material, the quantity of tears deposited on the lens with each blink, the ambient humidity, temperature and air flow around the eye.

Superior dehydration/rehydration behavior of soft lens materials provides the material with increased dimensional stability. If a soft lens material can be made to dehydrate (allow evaporation) more slowly, then the lens will remain closer to its saturated state. Equally important is the importance of rehydration. If a lens material can be made to re-absorb water more rapidly, then the lens can return to a state closer to saturation during each blink, when the lens is bathed in tear fluid. Thus, an ideal soft contact lens is one constructed from a composition that is both slow to dehydrate and quick to rehydrate.

SUMMARY OF THE INVENTION

Accordingly, an object of the present invention is to provide an ionic contact lens having improved dimensional stability and improved performance and comfort.

Another object of the present invention is to provide an ionic spheric contact lens, an ionic toric contact lens, and an ionic multifocal contact lens, each having superior dimensional stability.

Another object of the present invention is to provide a contact lens with a low rate of dehydration coupled with a high rate of rehydration, relative to ionic lenses currently available.

Still another object of the present invention is to provide an ionic contact lens with a superior water balance, or ratio of dehydration to rehydration.

It also an object of the present invention to provide an ionic polymer useful in constructing contact lenses and contact lens blanks having the features described above.

It is also an object of the invention to provide methods of making contact lenses having the features described above.

The present inventors undertook a program of research to develop a material composition for soft ionic contact lenses having enhanced dimensional stability and a superior water balance ratio than current commercial materials. They discovered that terpolymers of 2,3-dihydroxy-propyl methacrylate, 2-hydroxyethyl methacrylate, and methacrylic acid possess a low rate of dehydration coupled with a high rate of rehydration and, accordingly, would furnish ionic contact lenses having enhanced dimensional stability.

Therefore, the above objectives, among others, have been accomplished by providing in accordance with a first aspect of the invention, a contact lens or contact lens blank constructed from a terpolymer of 2,3-dihydroxypropyl methacrylate (glyceryl methacrylate hereinafter referred to as "GMA") with 2-hydroxyethyl methacrylate ("2-HEMA"), and methacrylic acid ("MAA").

These objectives, among others, have been accomplished by providing in accordance with another aspect of the invention, a terpolymer of 2,3-dihydroxypropyl methacrylate (glyceryl methacrylate hereinafter referred to as "GMA") with 2-hydroxyethyl methacrylate ("2-HEMA"), and methacrylic acid ("MAA"). There is also provided a contact lens blank formed from such a material.

There is also provided in accordance with the present invention a process for preparing a contact lens including (a) forming a terpolymer from 2,3-dihydroxypropyl methacrylate, 2-hydroxyethyl methacrylate, and methacrylic acid, and (b) forming a contact lens from said terpolymer.

There is also provided in accordance with the present invention a process of preparing a contact lens including (a) polymerizing a reaction mixture of 2,3-dihydroxypropyl methacrylate, 2-hydroxyethyl methacrylate, and methacrylic acid in a mold to form a complete or partial contact lens.

Further objects, features, and advantages of the present invention will become apparent from the detailed description of preferred embodiments that follows.

BRIEF DESCRIPTION OF THE DRAWINGS

A more complete appreciation of the invention and many of the attendant advantages thereof will become better understood by reference to the following detailed description when considered in connection with the accompanying drawings, wherein.

DETAILED DESCRIPTION OF PREFERRED EMBODIMENTS

Figure 1:
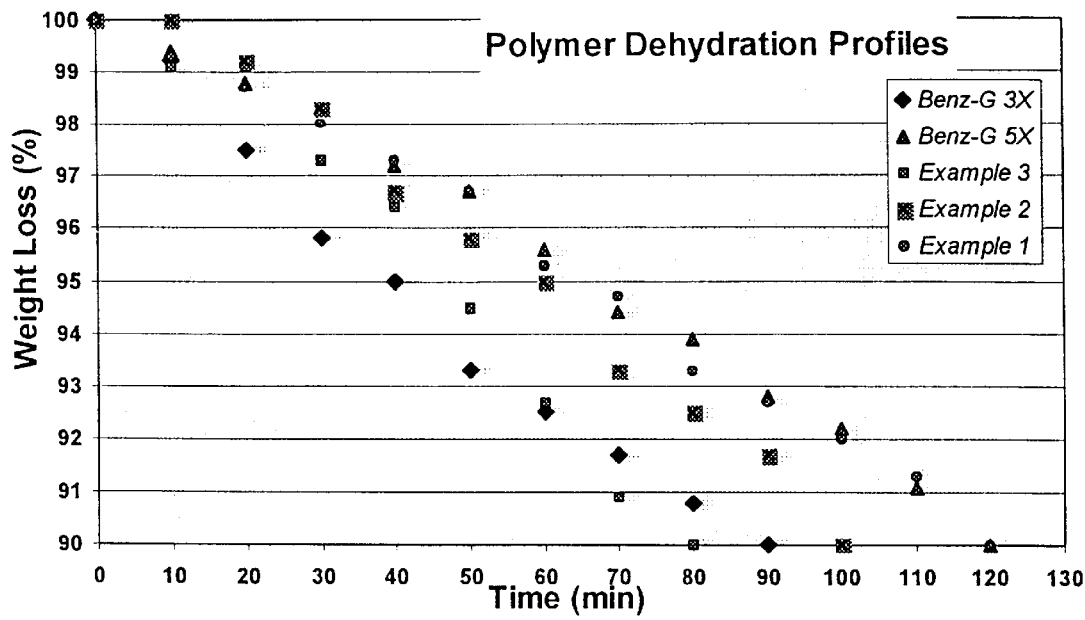
FIG. 1 depicts the dehydration of various polymers, including those of the present invention.

Other features of the invention will become apparent in the course of the following descriptions of exemplary embodiments which are given for illustration of the invention and are not intended to be limiting thereof.

The terpolymer of the present invention is made by any known method of polymerizing unsaturated monomers. Such methods are well known to those in the polymer chemistry field. Suitable polymerization methods include the free radical bulk polymerization methods taught by U.S. Pat. No. 4,056,496 to Mancini et al., U.S. Pat. No. 3,985,697 to Urbach, and U.S. Pat. No. 3,947,401 to Stamberger, all of which are incorporated here by reference. The proportions of the reactants and the reaction conditions can be varied so as to optimize results. Suitable catalysts and initiators, such as those taught by the cited U.S. patents incorporated by reference, can be used.

Crosslinking agents can also be used as desired. Known cross-linking agents, for example, as taught in U.S. Pat. No. 4,038,264 to Rostoker et al., which is incorporated herein by reference in its entirety, are useful in proportions ascertainable by one skilled in the art. Crosslinking agents mentioned in U.S. Pat. No. 5,532,289 and U.S. Ser. No 08/674,275, both previously incorporated by reference, can be used. Divinylbenzene and hexane diol dimethacrylate and the like can be used. An especially useful crosslinking agent is ethylene glycol dimethacrylate. The crosslinkers are used in an amount effective to give desired crosslinking. This is generally in an amount from 0.01 to 0.2 percent by weight of the terpolymer.

The polymer useful in the contact lenses of the present invention are formed from 2-HEMA, GMA, and MAA monomers. The terpolymers can include any desired ratios of 2-HEMA and GMA, such as those described in U.S. Pat. No. 5,532,289 and U.S. application Ser. No. 08/674,275. MAA is used in an amount effective to give an ionic polymer. The amount of GMA and/or MAA can be increased to increased the water content of the polymer, compared to the 38% water content of poly-HEMA-based hydrogels.

Especially useful as the terpolymers of the present invention are terpolymers including about 10 to about 90 mole percent of 2,3-dihydroxypropyl methacrylate units, about 40 to about 60 mole percent of 2-hydroxyethyl methacrylate units, and about 0.3 to about 3.0 mole percent of methacrylic acid units, wherein the total amount of units in the terpolymer is 100 mole percent. In other embodiments of the invention, the GMA constitutes between 15 mole % and 60 mole % of the terpolymer and in a still another embodiment of the present invention, GMA constitutes between 20 mole % and 55 mole % of the terpolymer. In another embodiment, HEMA constitutes from about 50 to about 80 mole percent of the terpolymer. In another embodiment, MMA constitutes from about 0.5 to about 2 mole percent of the terpolymer. The terpolymer can comprise about 22 to about 48 mole percent of 2,3-dihydroxypropyl methacrylate units, about 51 to about 76 mole percent of 2-hydroxyethyl methacrylate units, and about0.8 to about 1.6 mole percent of methacrylic acid units, wherein the total amount of units in the terpolymer is 100 mole percent.

The terpolymers in addition to the three monomers may be formed from and include minor amounts of other monomers so long as such monomers do not adversely effect the characteristics of the contact lenses formed from the terpolymer. Such monomers may be present as impurities in the three monomers or may be intentionally added. For example, N-vinylpyrolidone and/or acrylamides can be present in a concentration of 5 mole percent or less of the terpolymer; for example, from 0.1 to 5 mole percent. Preferably the terpolymers consists essentially of the HEMA, GMA, and MAA. The presence of MAA gives the material an ionic character.

While as mentioned above impurities can be present in the monomers so long as they do not adversely effect the contact lens formed from the terpolymer, in further embodiments of the invention, it is important that the GMA be pure and free of impurities such as glycidyl methacrylate and glyceryl dimethacrylate. Thus, while the GMA is synthesized by the known method as taught by Mancini et al, U.S. Pat. No. 4,056,496, it is preferably further purified by distillation to remove impurities, such as glycidyl methacrylate and glyceryl dimethacrylate. A useful method of purification is vacuum distillation.

2-HEMA and methacrylic acid are commercially available. These monomers can be purified by vacuum distillation as taught by Urbach. Therefore, all of the 2-HEMA, GMA, and MAA can be purified by vacuum distillation prior to polymerization to form the terpolymers.

The terpolymers themselves form part of the present invention. The terpolymer preferably consists essentially of 2-HEMA, GMA, and MAA. The terpolymer may be used, for example, to form contact lens blank. A contact lens blank is a rough piece of optical material of suitable size, design and composition for use, when ground and polished, as a contact lens.

A hydrogel can be formed from the terpolymers of the invention in a known manner. This can be accomplished by hydrating the polymer after polymerization in bulk, in an aqueous solvent, or in an organic solvent. The composition generally has a water content ranging from about 45% to about 75%. In another embodiment the water content ranges from about 50 to about 65% by weight.

Table 1 shows the water content of some of the polymers according to the present invention having various proportions of the monomers shown. These polymers are produced in Examples 1–3 that follow. The water content can be varied by those having ordinary skill in the art by known methods.

TABLE 1

| Principal components in the formulae | | | |
|---|---|---|---|
| HEMA Mole % | GMA mole % | MAA Mole % | Water Content Percent by Weight ±1% |
| 51 | 48.2 | 0.8 | 61 (Example 1) |
| 76 | 22.4 | 1.6 | 55 (Example 2) |
| 76 | 23.2 | 0.8 | 51 (Example 3) |

The contact lenses of the present invention can include further ingredients, such as colorants, for example, pigments, and UV-blockers.

The present invention is further described with reference to the following examples. The examples are for illustrative purposes and do not limit the scope of the invention.

EXAMPLE 1

Preparation of GMA/HEMA/MAA Terpolymer with 61% Water Content 540 grams of GMA were mixed with 460 grams of 2-HEMA, 5 grams of MAA, and 0.6 gram of 2,2-azobis (2,4-dimethylvaleronitrile) were added. The total diester concentration was adjusted to 0.6% by weight with ethylene glycol dimethacrylate. The mixture was degassed by applying vacuum with vigorous stirring. The mixture was dispensed into cylindrical molds, polymerized at 35° C. for a minimum of 5 hours, and post-cured at 110° C. for 5 hours. The polymer was removed from the molds and cut into cylinders approximately 0.5 inch (approximately 1.27 cm) in diameter and approximately 0.208 inch (approximately 0.538 cm) in height suitable for contact lenses. The blanks were then heat-treated (annealed) at 110° C. for 5 hours. After annealing, the blanks were ground and lapped to right cylinders of approximately 0.5 inch in diameter and 0.2 inch in height.

EXAMPLE 2

Preparation of GMA/HEMA/MAA Terpolymer with 55% Water Content 271 grams of GMA were mixed with 729 grams of 2-HEMA, 10 grams of MAA and 0.6 grams of 2,2-azobis (2,4-dimethylvaleronitrile) was added. The total diester concentration was adjusted to 0.6% by weight with ethylene glycol dimethacrylate. The mixture was degassed by applying vacuum with vigorous stirring. The mixture was dispensed into cylindrical molds, polymerized at 35° C. for minimum of 5 hours, and post-cured at 110° C. for 5 hours. The polymer was removed from the molds and cut into cylinders approximately 0.5 inch (approximately 1.27 cm) in diameter and approximately 0.208 inch (approximately 0.53 cm) in height suitable for contact lenses. The blanks were then annealed at 110° C. for 5 hours. After annealing, the blanks were ground and lapped to right cylinders of 0.5 inch in diameter and 0.2 inch in height.

EXAMPLE 3

Preparation of GMA/HEMA/MAA Terpolymer with 51% Water Content 271 grams of GMA were mixed with 729 grams of 2-HEMA, 5 grams of MAA and 0.6 grams of 2,2-azobis (2,4-dimethylvaleronitrile) was added. The total diester concentration was adjusted to 0.6% by weight with ethylene glycol dimethacrylate. The mixture was degassed by applying vacuum with vigorous stirring. The mixture was dispensed into cylindrical molds, polymerized at 35° C. for 5 hours, and post-cured at 110° C. for 5 hours. The polymer was removed from the molds and cut into cylinders approximately 0.5 inch (approximately 0.508 cm) in height suitable for contact lenses. The blanks were then annealed at 110° C. for 5 hours. After annealing, the blanks were ground and lapped to right cylinders of 0.5 inch in diameter and 0.208 inch in height.

The terpolymers of these three examples have an ionic character due to the use of MA and contact lenses of these terpolymers are Group 4 hydrogels (high water, ionic).

A study was conducted to determine the dehydration and rehydration behavior of lenses of similar thickness constructed from polymers of Examples 1–3 and other materials. Table 2 lists various polymer compositions and their nominal water content. In this table, the prefix "p" designates a polymer constructed from the monomer or comonomers indicated.

TABLE 2

| Materials used in this study | | | |
|---|---|---|---|
| Lens Material | Nominal Water Content % ± 1 | Lens Material | Nominal Water Content % ± 1 |
| p-HEMA (Polymacon) | 38 | Example 1 | 61 |
| p-GMA/HEMA-I (Hioxfilcon B) | 49 | Example 2 | 55 |

TABLE 2-continued

Materials used in this study

| Lens Material | Nominal Water Content % ± 1 | Lens Material | Nominal Water Content % ± 1 |
|---|---|---|---|
| p-GMA/HEMA-II (Hioxfilcon A) | 59 | Example 3 | 51 |
| p-HEMA/MAA (Methafilcon) | 55 | | |

The water balance of lenses according to the present invention and comparative lenses were determined as follows:

Procedure for Determining Water Balance in Lenses

The purpose of this test is to determine the water balance of hydrogel lenses using gravimetric techniques. Water balance is defined as the ratio of the time it takes a lens to dehydrate by 10% of its water weight and the time it takes to return to its initial hydrated weight (saturation) from 10% of dehydrated water weight. Values are reported relative to p-HEMA (Polymacon,38%), used as a control.

It is important that ambient conditions for the test be constant for all the test lenses and control. These conditions must be measured accurately and the measuring equipment must be calibrated against accepted standards. The specified conditions are 21°±20° C. and 50 ±3% RH.

For each material, dry, constant thickness lenses are cut based on expansion factors to yield a final, wet constant, thickness lens of 0.10±0.01 mm. To facilitate lens holding by a wire, a small hole can be introduced into the lens during dry stage fabrication. Finished dry lenses are cleaned and hydrated overnight in buffered saline solution. BENZ buffered saline solution is composed of 8.01 grams NaCl, 2.47 grams of $H_3BO_3$ and 0.14 grams $Na_2B_4O_7.10H_2O$ in 1 liter of distilled water, with a pH=7.25±.08 and an osmolarity of 295±2 mOs at 22.5° C.

Lens Dehydration procedure

Place wire on scale and set tare weight. Remove a clean fully hydrated sample lens from saline vial, secure lens on wire holder and blot gently with a lint free paper. Hang the wire holder on a balance scale, weigh and record weight. Dehydrate the lens by 10% of its water weight, recording the weight and cumulative time every 10 seconds until the 10% weight loss is achieved. Dehydration is allowed to occur without introducing any air circulation except that which takes place normally with the doors of the balance open. After test is complete, return the lens to the saline beaker, allow the lens to rehydrate back to saturation and repeat the drying procedure a minimum of 2 more repetitions to obtain an average weight loss time. FIG. 1 shows the dehydration profiles of lenses according to the present invention and Benz-G 3× and 5× lenses which are formed of GMA-HEMA copolymers. The 3× has 49% water content and the 5× has 59% water.

Lens Rehydration procedure

Figure 2:
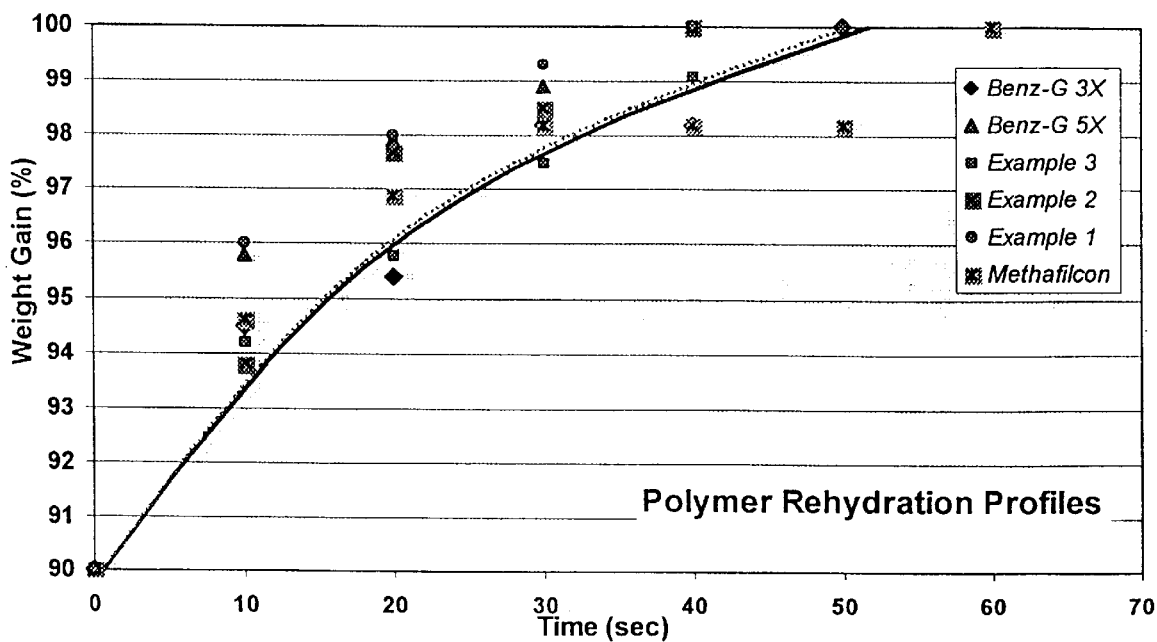
FIG. 2 depicts the rehydration of various polymers, including those of the present invention.

Place wire on scale and set tare weight. Remove a clean fully hydrated sample lens from saline vial, secure lens on wire holder and blot gently with a lint free paper. Hang the wire holder on the balance scale and weigh the lens to determine the weight of the saturated lens. Record the weight. Allow the lens to dehydrate 10% of its water weight. Record weight. Remove wire holder from the scale and submerge the lens in buffered saline at 21°±2° C. for exactly 10 seconds. Remove the lens from the saline, blot gently with a lint free paper and weigh the lens. Record the weight and time hydrated. After weight is recorded, re-submerge the lens 10 more seconds. Blot and record the weight and cumulative time hydrated. Continue this procedure until the saturated weight of the lens is achieved. It is possible that some materials will not return to the fully hydrated state due to water lost during the brief time it takes to blot and weigh the lens. In this case, continue to cycle the lens until a steady state is achieved. Repeat complete procedure a minimum of 3 times to obtain an average weight gain time. FIG. 2 shows the rehydration profiles.

Results

The water balance ratio is reported as the ratio of the average time (in minutes) to dehydrate the specified constant thickness lens by 10% of its water weight to the average time (in minutes) to rehydrate to its initial hydrated weight (saturation) from 10% of dehydrated water weight relative to the p-HEMA control. (WB Ratio for p-HEMA=1)

Figure 3:
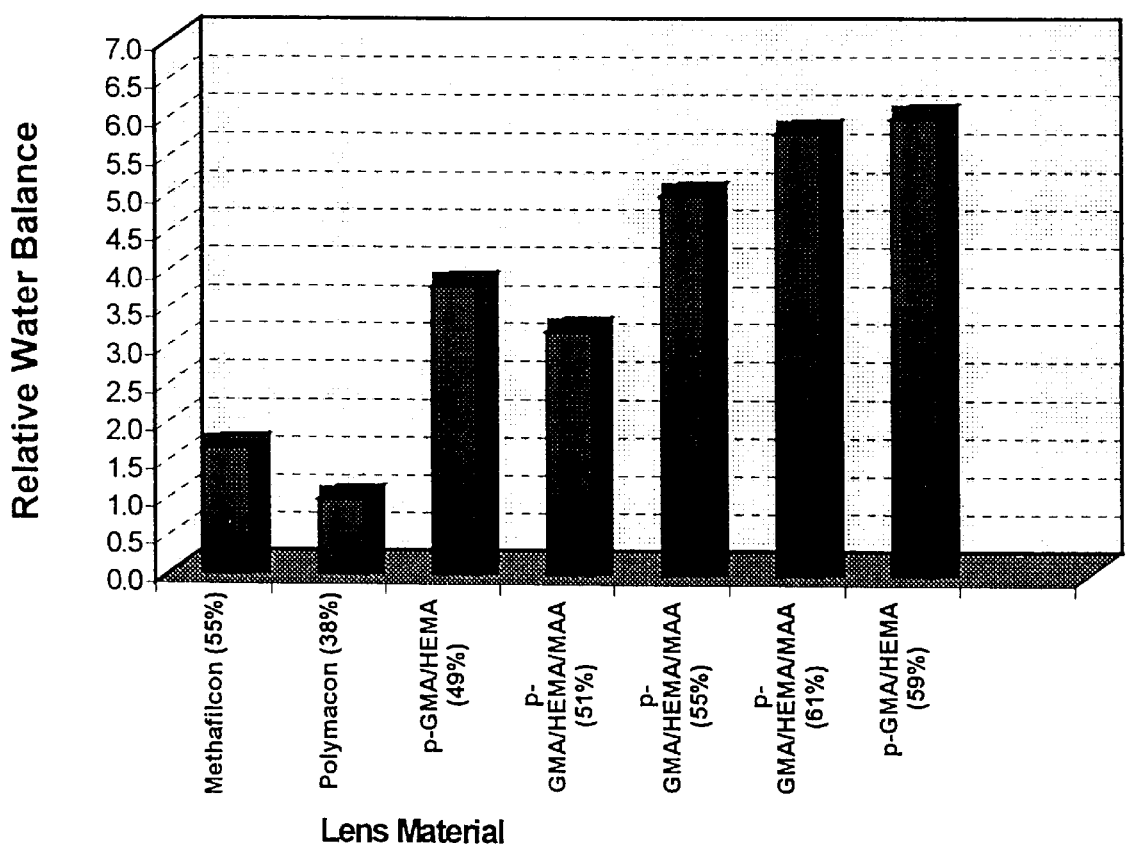
FIG. 3 depicts the relative water balance values (Polymacon=1) of various polymers including those of the present invention.
Figure 4:
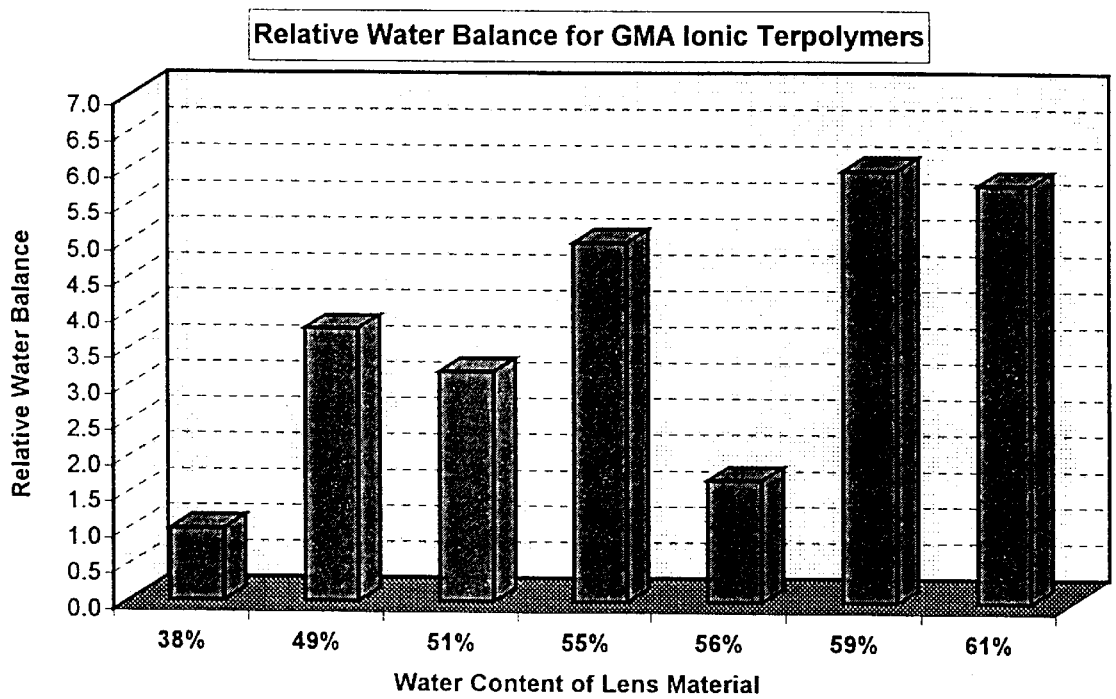
FIG. 4 depicts the water balance values, of the various polymers shown in FIG. 3, based on water content.

The water balance ratios are shown in FIGS. 3 and 4. Terpolymers of 2,3-dihydroxypropyl methacrylate, 2-hydroxyethyl methacrylate, and methacrylic acid according to the present invention show faster rehydration behavior and shorter time-to-saturation than comparable ionic soft lens materials (Methafilcon). This rapid rehydration behavior, when combined with their slow dehydration rates, allows these materials to maintain a hydrated state much closer to saturation during the entire wearing cycle relative to conventional contact lens compositions. This "hydro-equilibrium" is termed "water balance".

"Water balance" is an inherent property dependent on the material's ability to bind water and can be examined by the rates of dehydration and rehydration. The ratio of these two parameters serves as a guide to lens stability and comfort. FIG. 3 compares the in vitro performance of the examples of the present invention against various commercial materials. FIG. 4 shows the water balance ratio plotted against nominal water content for materials of the present invention. It is seen that the ionic lenses according to the present invention have superior water balance as compared to other ionic lenses. For example, a relative water balance of greater than about 2, and even greater than about 3 can be achieved, relative to p-HEMA.

With the integration of glyceryl methacrylate, MAA and 2-HEMA, new ionic terpolymers with an enhanced water balance and a water content in the range from 45 to 75% can be synthesized. Lenses from the new material show good strength, fine handling, and excellent water retention properties. Lenses made from the terpolymer have enhanced dynamic stability and comfort due to improved water-balance performance. Since the lenses have substantially reduced water loss (increased water retention) throughout the wear cycle, they can be used as daily wear lenses for use in all waking hours, or extended wears lenses, that provide superior comfort.

The ionic terpolymers of the present invention have substantially higher water balance than 2-HEMA and Methafilcon. The terpolymers provide lenses with much improved water balance values compared to commercially available ionic lenses. The excellent WB value of the terpolymers corresponds to improved contact lens performance and comfort.

Obviously, numerous modifications and variations of the present invention are possible in light of the above teachings. It is therefore to be understood that within the scope of the appended claims, the invention may be practiced otherwise than as specifically described herein.

What is claimed is:

1. A contact lens which has a water balance of greater than about 2 relative to that of poly(2hydroxyethylmethacrylate), made from a terpolymer of 2,3-dihydroxypropyl methacrylate, 2-hydroxyethyl methacrylate, and methacrylic acid.

2. A contact lens according to claim 1, wherein the terpolymer is formed of monomers that consist essentially of 2,3-dihydroxypropyl methacrylate, 2-hydroxyethyl methacrylate, and methacrylic acid.

3. A contact lens made from a terpolymer, wherein the terpolymer comprises about 10 to about 60 mole percent of 2,3-dihydroxypropyl methacrylate units, about 40 to about 90 mole percent of 2-hydroxyethyl methacrylate units, and about 0.3 to about 3.0 mole percent of methacrylic acid units, wherein the total amount of units in the terpolymer is 100 mole percent.

4. A contact lens according to claim 1, which has a water content ranging from about 45% to about 75% by weight.

5. A contact lens according to claim 1, wherein the terpolymer comprises about 20 to about 60 mole percent of 2,3-dihydroxypropyl methacrylate units.

6. A contact lens according to claim 1, wherein the terpolymer is made with a crosslinking agent.

7. A contact lens according to claim 1, which is a soft contact lens.

8. A contact lens according to claim 1, wherein the 2,3-dihydroxypropyl methacrylate is purified by vacuum distillation prior to incorporation into the terpolymer.

9. A contact lens according to claim 7, which is a spheric lens.

10. A contact lens according to claim 7, which is a toric lens.

11. A contact lens according to claim 7, which is a multifocal lens.

12. A process for preparing a contact lens having a water balance greater than about 2 relative to that of poly (2-hydroxyethylmethacrylate) comprising:
    (a) forming a terpolymer from 2,3-dihydroxypropyl methacrylate, 2-hydroxyethyl methacrylate, and methacrylic acid, and
    (b) forming a contact lens from said terpolymer.

13. A process according to claim 12, further comprising hydrating the contact lens.

14. A process for preparing a contact lens having a water balance greater than about 2 relative to that of poly (2-hydroxyethylmethacrylate) comprising
    (a) polymerizing a reaction mixture of 2,3-dihydroxypropyl methacrylate, 2-hydroxyethyl methacrylate, and methacrylic acid in a mold to form a complete or partial contact lens.

15. A process according to claim 14, wherein step (a) forms a partial contact lens, and the process further comprises a step of mechanically forming the remainder of the lens.

16. A terpolymer of 2,3-dihydroxypropyl methacrylate, 2-hydroxyethyl methacrylate, and methacrylic acid, wherein the terpolymer comprises about 10 to about 60 mole percent of 2,3-dihydroxypropyl methacrylate units, about 40 to about 90 mole percent of 2-hydroxyethyl methacrylate units, and about 0.3 to about 3.0 mole percent of methacrylic acid units wherein the total amount of units in the polymer is 100 mole percent.

17. A terpolymer according to claim 16, formed from monomers consisting essentially of 2,3-dihydroxypropyl methacrylate, 2-hydroxyethyl methacrylate, and methacrylic acid.

18. A contact lens blank formed from a terpolymer according to claim 16.

19. A contact lens according to claim 3, wherein the terpolymer consists essentially of said 2,3-dihydroxypropyl methacrylate, said 2-hydroxyethyl methacrylate, and said methacrylic acid units.

20. A contact lens made from a terpolymer, wherein the terpolymer comprises about 22 to about 48 mole percent of 2,3-dihydroxypropyl methacrylate units, about 51 to about 76 mole percent of 2-hydroxyethyl methacrylate units, and about 0.8 to about 1.6 mole percent of methacrylic acid units, wherein the total amount of units in the terpolymer is 100 mole percent.

21. A terpolymer that comprises about 22 to about 48 mole percent of 2,3-dihydroxypropyl methacrylate units, about 51 to about 76 mole percent of 2-hydroxyethyl methacrylate units, and about 0.8 to about 1.6 mole percent of methacrylic acid units, wherein the total amount of units in the terpolymer is 100 mole percent.

22. A contact lens according to claim 3, which has a water balance of greater than about 2 relative to that of poly (2-hydroxyethylmethacrylate).

* * * * *